Oct. 13, 1942.　　J. E. FOERCH ET AL　　2,298,690
APPARATUS FOR FORMING BELTING
Filed April 15, 1941　　2 Sheets-Sheet 1
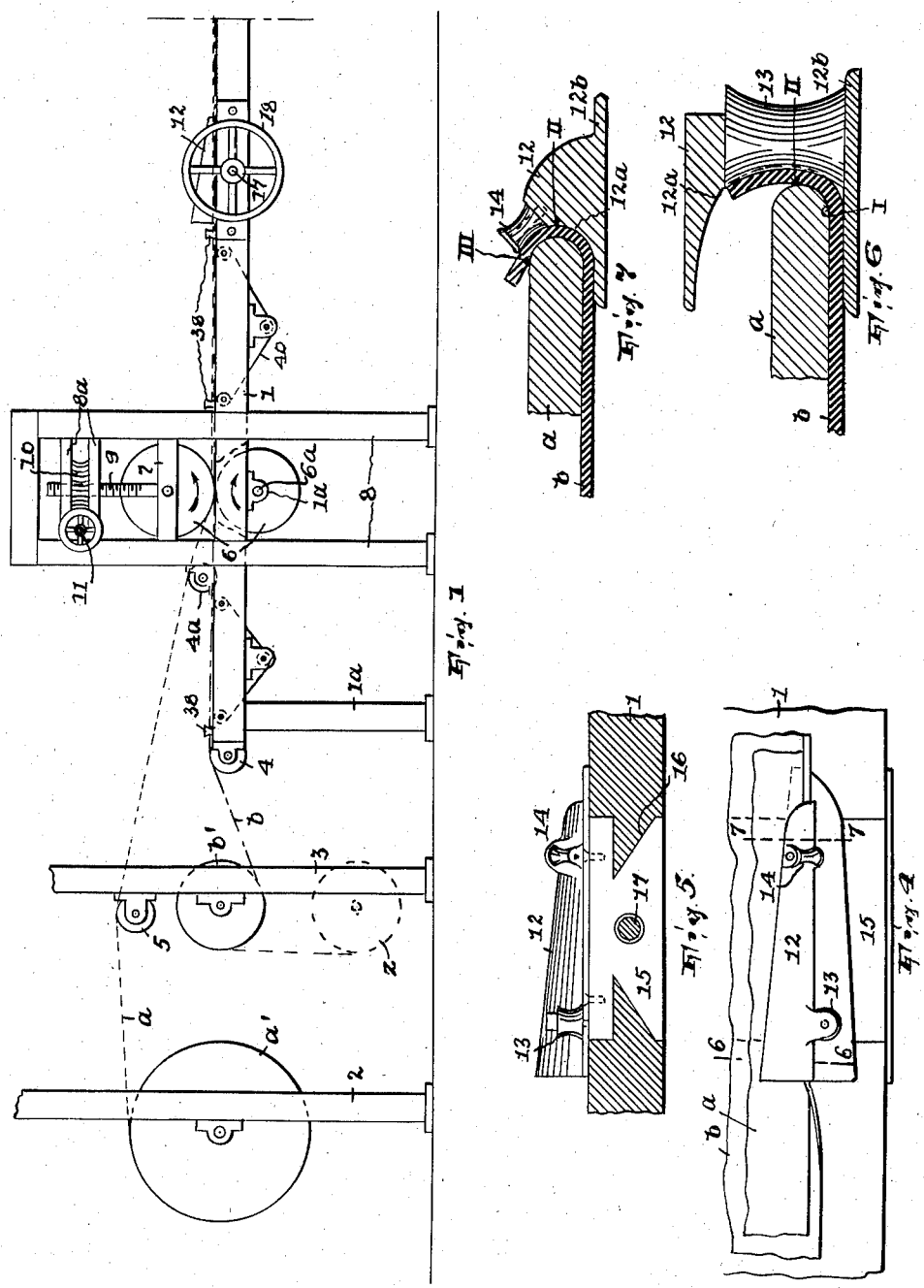
INVENTORS,
John E. Foerch and
Raymond Foerch,
BY
ATTORNEY

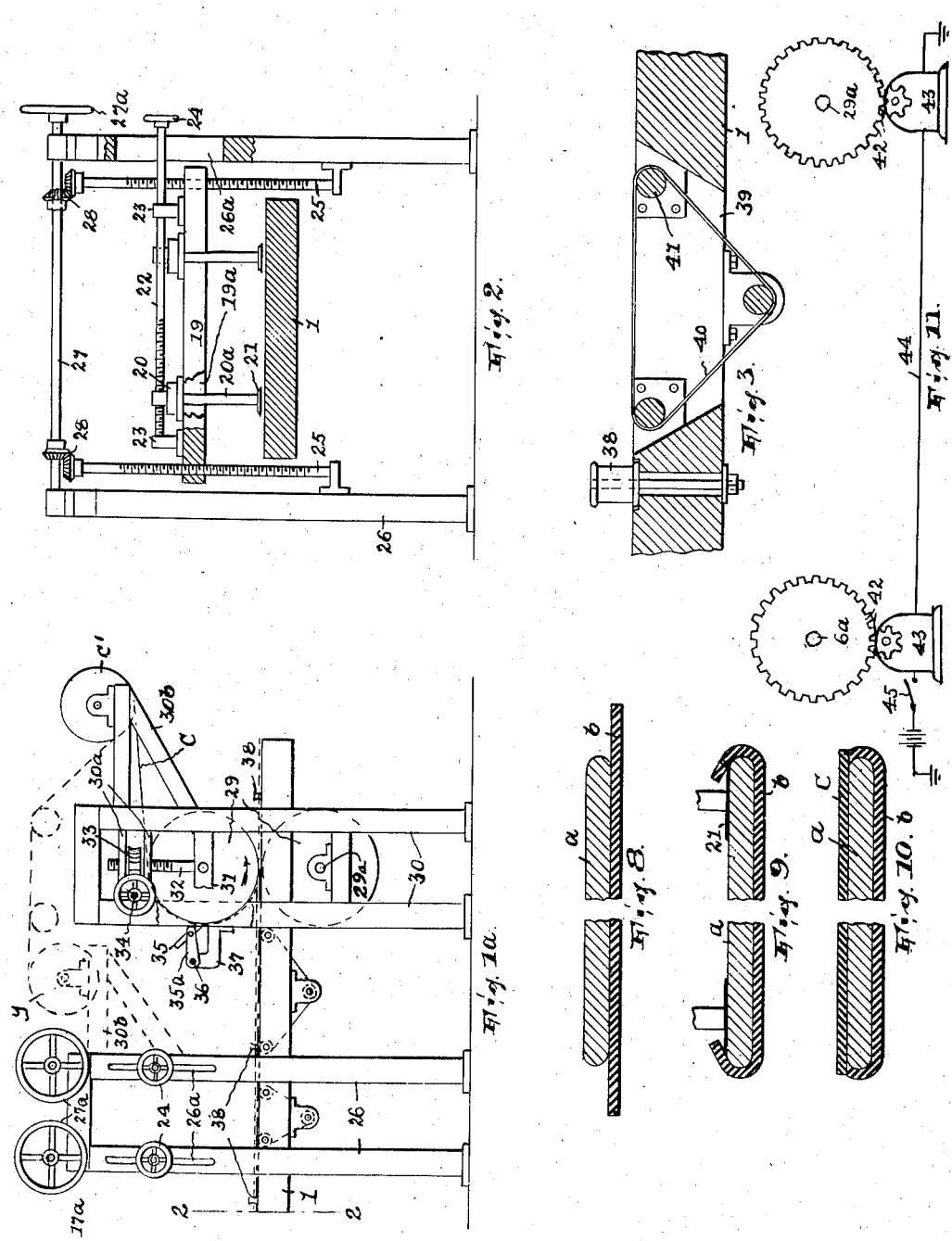

Patented Oct. 13, 1942

2,298,690

UNITED STATES PATENT OFFICE 2,298,690

APPARATUS FOR FORMING BELTING

John E. Foerch and Raymond Foerch,
Clifton, N. J.

Application April 15, 1941, Serial No. 388,641

4 Claims. (Cl. 154—3)

In the manufacture of belting, as conveyor belting, characterized by a carcase composed of a fabric or other fibrous strip and a cover or integument of rubber or equivalent plastic elastic strip material the procedure is conventionally as follows: Two of the latter strips, uncured, one to form the carrying side of the belt and the other its pulley side are used, the former being wider than and the latter about as wide as the carcase. A length of the carcase is laid on a table and a corresponding length of the carrying strip is laid on the carcase, with both margins of the carrying strip projecting equally, whereupon attendants work or manipulate the strip so as to establish adhesion and hence union between the two. When the carcase and such strip have been united in this way they are inverted as a unit and the projecting margins of the strip are manually bent upwardly and with knives manually skived or trimmed away so that the resulting edges of the strip are about flush with the top surface of the carcase, whereupon the pulley strip is laid on the carcase with its margins lapping the upturned edges of the carrying strip and the working is again done to cause the pulley strip to adhere to the carcase and its margins to adhere to the edges of the carrying strip. Of course, if the belting is to be longer than the table, which is usually the case, the working as to each rubber strip and the carcase has to be done in stages or the material advanced, after each working throughout the length of the table, to bring the carcase and strip on the table for the next succeeding working. Besides, there is the labor and loss of time involved in inverting the assembly first formed by uniting the carrying strip and carcase. Further, since the working is manually performed there is no positive assurance that the contact between the carcase and the rubber strips and the marginal portions of the latter will be uniform, much less that they will be united with a uniform degree of strength, or, if such a union is effected between the carcase and carrying strip, that it will be maintained in view of the handling incident to inverting the assembly formed by these elements.

According to this invention the operation of uniting the carcase and two rubber strips proceeds not only so that at all points each of said strips will be in uniform contact with the carcase and with the other strip where it is marginally opposed thereby but so that a state of bond uniform in degree of strength results. All three elements are treated simultaneously and in a continuous manner so that the loss of labor and time incident to inverting the material and the step-by-step handling thereof, with the consequent undoing of work already perhaps satisfactorily done, is avoided.

According to the invention, generally stated, the operations are as follows: The carcase and a strip of uncured tacky rubber, wider than the carcase and to form the carrying side of the belt, are supplied from suitable wound masses thereof and made to pass together over a suitable supporting surface, the strip being under the carcase, and first between two compressing rolls and then between devices which act in a peculiar way to fold or bend up and around the usually rounded edges of the carcase the projecting marginal portions of the strip, leaving said portions upwardly converging more or less. Then they are made to pass devices which trim away so much of such portions as extend above approximately the plane of the top surface of the carcase. Then they are made to pass a pair of calender rolls. Around the upper one of these rolls the uncured rubber strip which is to form the pulley side of the belt is fed so as to come to lie on the carcase, these rolls serving as the advancing means for all three elements of the belt and, by their pressure, to unite the pulley strip to the carcase and the margins of the pulley strip to the edges of the carrying strip, and incidentally by their pressure to increase the bond between the carcase and carrying strip. Coactive with the upper roll is a pair of knives which trim away the initial marginal portions of the pulley strip so that the new margins will lap said edges of the carrying strip without appreciably projecting. During all these operations the carcase and carrying strip are so guided that when the assembly they form meets the pulley strip they will exactly register with each other. The table preferably includes anti-friction means by which the assembly formed by the carcase and carrying strip is supported.

In the drawings,

Figs. 1 and 1a, taken together, show the apparatus of our invention in side elevation;

Fig. 2 is a vertical sectional view in the plane 2—2 at the left of Fig. 1a;

Fig. 3 is a longitudinal vertical sectional view of a fragment of the table with certain parts thereon;

Fig. 4 is a plan of a fragment of the table, showing one of the folding devices;

Fig. 5 shows a fragment of the table in vertical longitudinal section and such device in elevation;

Figs. 6 and 7 are transverse sections through said device and the carcase and carrying strip in two stages of the folding operation, said sections being respectively on approximately lines 6—6 and 7—7, Fig. 4;

Fig. 8 shows in transverse section the carrying strip and carcase assembled;

Fig. 9 shows them after the margins of the carrying strip have been bent or folded up and the skiving knives in elevation; and Fig. 10 shows the product of our invention in transverse section.

Fig. 11 shows in diagram a driving system for the lower rolls 6 and 29.

Let 1 be a table supported by standards 1a and some or all of the uprights hereinafter mentioned. In standards 2 and 3 are respectively journaled the bearings for the wound masses a' and b', the former comprising the carcase a and the latter the uncured rubber strip b which is to form the carrying side of the belt. This strip will usually exist wound together with some fabric strip so that the convolutions of the rubber strip will not adhere together, and as the latter strip is unwound the fabric strip may be wound up at z. The strip b extends over a roller 4 on the table. The carcase extends over a roller 5 on standards 3 above the mass b. The strip b is wider than the carcase. After passing roll 5 the carcase comes at roll 4a to overlie the strip but the two are so disposed that the marginal portions of the strip project more or less, as in Fig. 8. They then pass between pressure rolls 6, the lower one of which is here journaled in brackets 1a so as to project up through a suitable opening in the table, with the top surface of the table about tangent thereto, and the upper one of which may be journaled in bearings, such as 7, which are vertically adjustable in uprights 8 by having upstanding screws, as 9, in threaded engagement with worm-wheels 10 journaled in supports 8a connecting the uprights and to be manually rotated by a rotary worm 11.

The components formed by the strip and carcase now pass the folding devices or folders each constructed as follows: 12 is an elongated part formed with a groove 12a conforming generally to the shape of a cone, such part having a base 12b so associated therewith that in operative state the groove opens horizontally. Near the mouth or wider end of the groove said part has journaled therein on an upright axis a roller 13 having its periphery circumferentially grooved, the roller protruding slightly into the groove 12a of said part. Near the more restricted end of the groove 12a said part has journaled therein on a pitched axis (converging with base 12b away from the open side of said groove) another roller 14 of substantially the same form as roller 13 but smaller, this roller also protruding somewhat into groove 12a. The curvature of each roller groove approximately conforms to that of the groove 12a where the roller is located. There are two folders arranged to act with respect to both margins of the material being treated, or with their grooves 12a facing inwardly, the wider ends of such grooves facing oppositely to the direction of travel of the material. Each of such parts is secured to or in effect one with a block or carrier 15 formed to conform to and slide in a transverse slot 16 in the table. They are to be adjusted together toward and together from each other, for which purpose they are penetrated by a screw 17 journaled in the table and having a hand-wheel 18 and formed with right- and left-handed threaded portions engaging the respective carriers.

Having passed the folders the upstanding margins of the strip are to be trimmed away by assemblies which are susceptible of adjustment both transversely of the material being treated, as the width of the ultimate belt may require, and up and down, as the thickness of such belt may require. Each such assembly here includes a beam 19 carrying an electric motor 20 whose armature shaft 20a depends and has affixed to its lower end a disk-shaped knife 21 in a plane parallel with the top of the table. The motor and its shaft being adjustable transversely of the table or lengthwise of the beam, which has a slot 19a receiving the shaft, this adjustment is effected by a screw 22 journaled in bearings 23 on the beam, its threading being engaged with the motor and it having a hand-wheel 24. For supporting and vertically adjusting the beam there is a pair of vertical screws 25 journaled in suitable bearings on one of two pairs of uprights 26 which afford bearings for a transverse shaft 27 connected by bevel gearing 28 with said screws and having a hand-wheel 27a. Screw 22 projects laterally, its vertical movement being afforded by a slot 26a in one of said uprights. The assemblies are offset from each other lengthwise of the machine so as to permit adjustment of the knives together without interfering with each other as when they operate on material going to form a quite narrow belt.

Having passed the means for skiving away the upstanding margins of the strip b the material including said strip and carcase now passes between a pair of calender rolls 29. The lower one of these is journaled in brackets in two opposed pairs of uprights 30 and projects up through an opening in the table so that the top surface of the latter is about tangent with such roll. The upper roll is journaled in carriers 31 adjustable vertically in said uprights, each carrier having an upright screw 32 in threaded engagement with a worm-wheel 33 journaled in supports 30a connecting the uprights and the two worm-wheels being engaged with a rotary worm 34. An extension-frame 30b projects from the uprights and in this is journaled a wound mass c' of the uncured rubber strip c which is to form the pulley side of the finished belt. This strip is directed around the upper one of the rolls 29 so as to come to be imposed on the upper one of the two plies formed by the carrying strip b and the carcase a and partake in their advance. (As in the case of strip b strip c will usually exist wound in said mass with fabric which, as the unwinding of the mass is effected, will be wound up at y.)

It is to be understood that at least the rolls 29 are driven so that they will pull the assembly formed by the plies a and b away from the rolls 6 and effect delivery of the assembly comprising them and strip c. Strip c as it exists wound at c' is somewhat wider than the assembly formed by the carcase and strip b after such assembly has passed the folders and knives and so has to have its margins trimmed away. This is effected by knives 35 which act against the periphery of the upper roll and are mounted in supports 35a adjustable toward and from each other and around a fixed shaft 36 supported in brackets 37 on uprights 30 first approached by the carcase and strip b.

The carcase and strip b and the assembly formed by them and strip c should be confined against lateral displacement while traveling, for which purpose there are provided at suitable intervals on the table flanged rollers 38 which may be so mounted as to be adjustable transversely of the table.

Preferably at suitable intervals the table will be formed with openings 39 each to accommodate a belt 40 extending around freely revoluble rollers 41 journaled in the table, the top stretch of the belt being preferably somewhat above the top surface of the table. Thereby the frictional resistance to advance of the belt components is materially reduced.

According to our invention a belt ready for vulcanizing is formed by a continual or running operation including these steps: A carcase and an uncured rubber strip to form the carrying side of the belt, being wider than the carcase, are continually advanced over a supporting surface with the strip superposed by and having its marginal portions projecting initially beyond the lateral edges of the carcase. In their advance they first undergo compression (as at 6) distributed uniformly transversely thereof so as to cause them to adhere for the full width of the carcase. Next, they are subjected to the action of the folders which, as will be more specifically set forth hereinafter, fold the extended margins of said strip around said edges of the carcase, leaving them disposed as in Fig. 7 and adhering to the carcase. Next, so much of each of said margins as is left above approximately the plane of the top surface of the carcase is skived away as in Fig. 9. Next, they again undergo compression (as at 29), together with an uncured rubber strip c to form the pulley side of the belt, which compression is distributed uniformly transversely of all three so as to cause the under broad face of the latter strip to adhere to the broad upper face of the carcase and incidentally increase the bond between the first strip and carcase, and also effect union between the strip c and the edges of strip b which were left by the skiving. The upper roll 29 serves to coact with the knives 35 which skive away so much of the marginal portions of the upper ply as will be superfluous in the completed assembly.

As for the folders: The entry of the projecting marginal portions of strip b into the fixed parts or conductors 12 of the folders is here manually effected when the leading end of the unit resulting from bonding the carcase and said strip together at 6 attains the folders. The conductor in each case effects the bending or folding over and, due to the progress of said unit and the tapering form of the groove of the conductor, it does so crosswise of the marginal portion progressively, whereby air between the carcase and such marginal portion is continually expelled and thus the existence of air blisters in the product is avoided. The function of each conductor is to fold and bring the folded marginal portion of the strip into at least closely facing relation to the rounded edge surface of the carcase; it is here not to subject said portion to the pressure required to set up the degree of bond necessary between the carcase and marginal portion of the strip, for that would in some cases necessitate such frictional resistance between the strip and conductor that the strip would bunch up or gather and become wrinkled. Such pressure is provided by the rollers 13—14, or without existence of appreciable friction and so as to be localized; in short, it is a rolling pressure. And just as the conductor acts progressively to fold so the rollers act progressively to bond strip b to the rounded edge of the carcase in the sense that when the marginal portion of the strip has been by the conductor in part laid close to said rounded edge, as from I to II in Fig. 6, the roller 13 exerts the required bonding pressure, and when said marginal portion has been further laid close to said rounded edge, as from II to III in Fig. 7, the roller 14 exerts the required bonding pressure, the rollers acting successively in their respective zones. In this way each marginal portion is securely bonded to the rounded edge portion of the carcase very firmly, without wrinkling or the forming of blisters, and so that the skiving away of the portions of the margins of strip b can be done evenly.

On delivery of the product from the treatment, as when it leaves rolls 29, it is then subjected to the usual vulcanizing treatment.

The lower rolls 6 and 29 are preferably both driven (Fig. 11) and so that the application or cutting off of power therefrom simultaneously affects both rolls. With the shafts 6a and 29a of these rolls are geared, as at 42, the armature shafts of two electric motors 43 in a circuit 44 provided with a circuit-closer 45.

Having thus fully described our invention, what we claim is:

1. In combination, with structure affording a supporting surface over which to advance a pair of superposed plies one of which is more flexible than, and has its lateral margins projecting beyond the lateral edges of, the other, of conductors carried by said structure and having grooves tapering in the direction of advance of said plies and arranged to receive the margins of the flexible ply when folded over said edges of the other ply, and means to press said margins, as so folded, against the respective edges including rollers journaled on crossing axes and offset from each other lengthwise of and having their peripheries protruding into the grooves of the respective conductors.

2. The combination set forth in claim 1 characterized by said grooves being cross-sectionally curved and by said rollers having circumferential grooves which in cross-section substantially parallel the grooves of the respective conductors.

3. A device for the purpose set forth including a conductor having a groove generally curved in cross-section and a roller journaled in the conductor on an axis crossing the groove and having its periphery circumferentially grooved, said roller protruding into the groove of the conductor and having its own groove as viewed in cross-section through both grooves inward of and substantially paralleling the groove of the conductor.

4. A device for the purpose set forth including a conductor having a groove generally curved in cross-section and rollers offset from each other lengthwise of said groove on axes crossing the latter and each other and each having its periphery circumferentially grooved, each roller protruding into the groove of the conductor and having its own groove as viewed in cross-section through the latter and the groove of the conductor inward of and substantially paralleling the latter groove.

JOHN E. FOERCH.
RAYMOND FOERCH.